Figure 27:
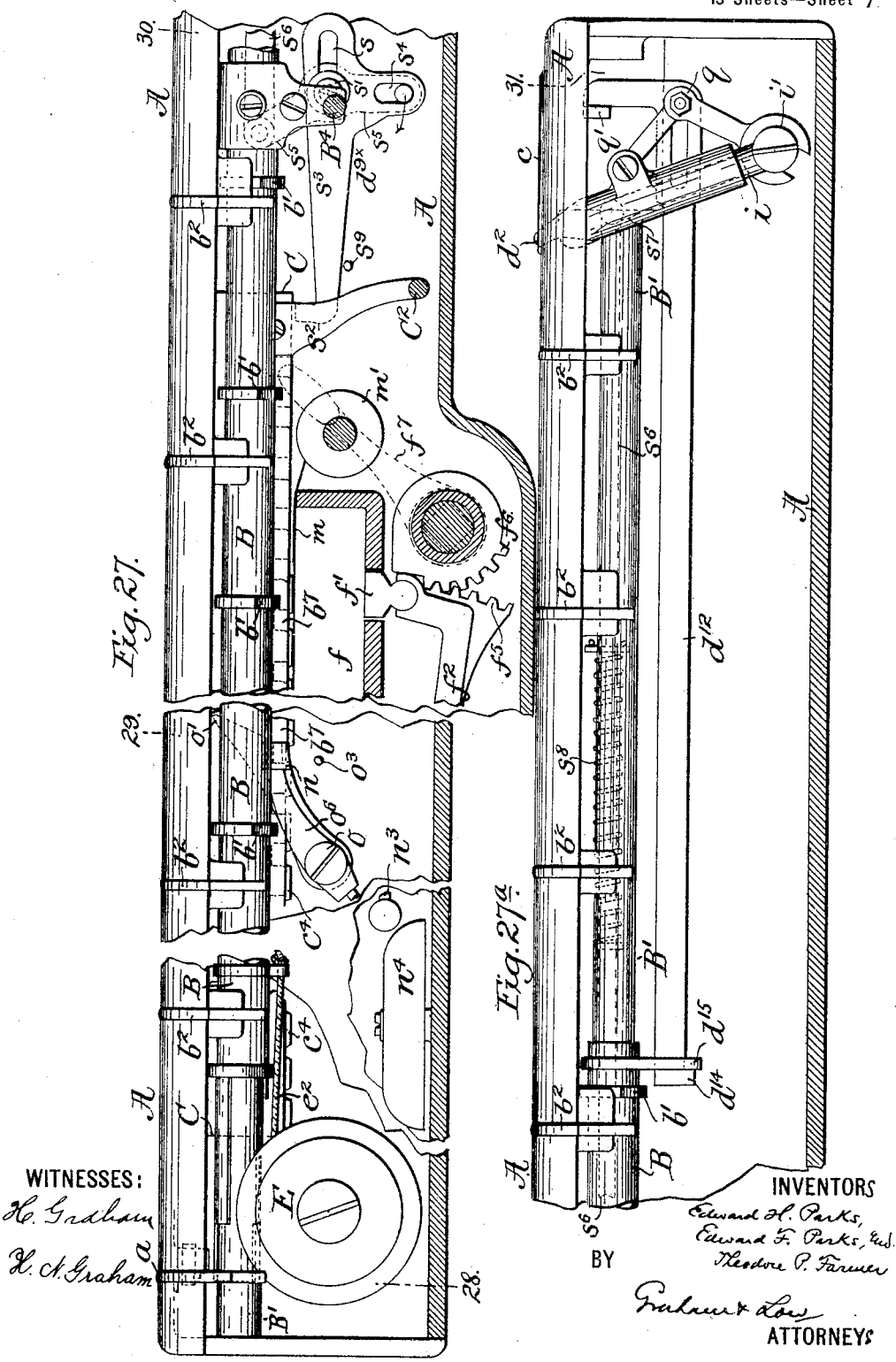

No. 633,102. Patented Sept. 12, 1899.
E. H. & E. F. PARKS & T. P. FARMER.
MEASURING MACHINE.
(Application filed Mar. 17, 1894.)
(No Model.) 13 Sheets—Sheet 1.
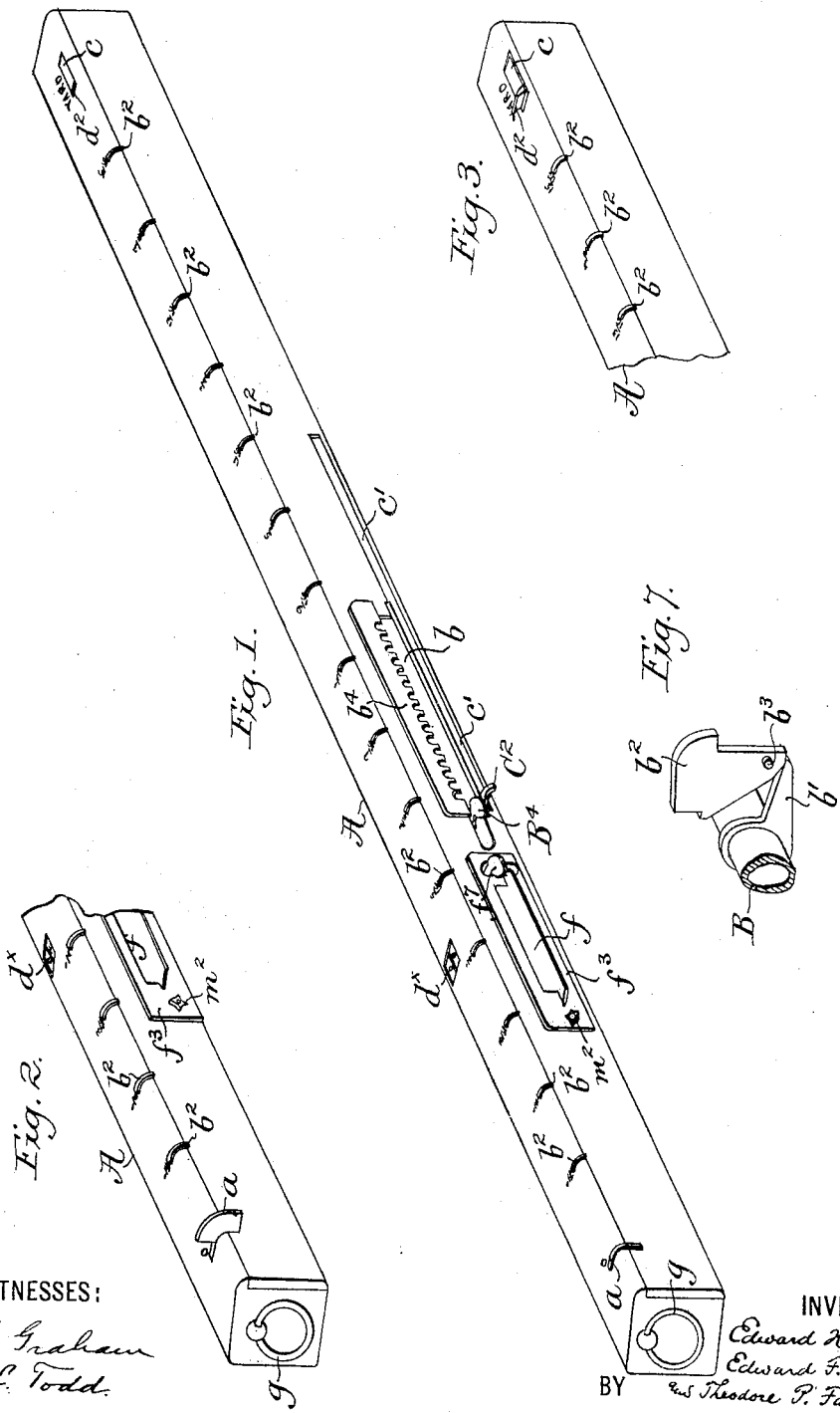
WITNESSES:
H. Graham
E. L. Todd
INVENTORS.
Edward H. Parks
Edward F. Parks
Theodore P. Farmer,
BY
Graham & Low
ATTORNEYS No. 633,102. Patented Sept. 12, 1899.
E. H. & E. F. PARKS & T. P. FARMER.
MEASURING MACHINE.
(Application filed Mar. 17, 1894.)

(No Model.) 13 Sheets—Sheet 2.

WITNESSES:
H. Graham
E. L. Todd.

INVENTORS
Edward H. Parks,
Edward F. Parks and
Theodore P. Farmer
BY
Graham & Low
ATTORNEYS

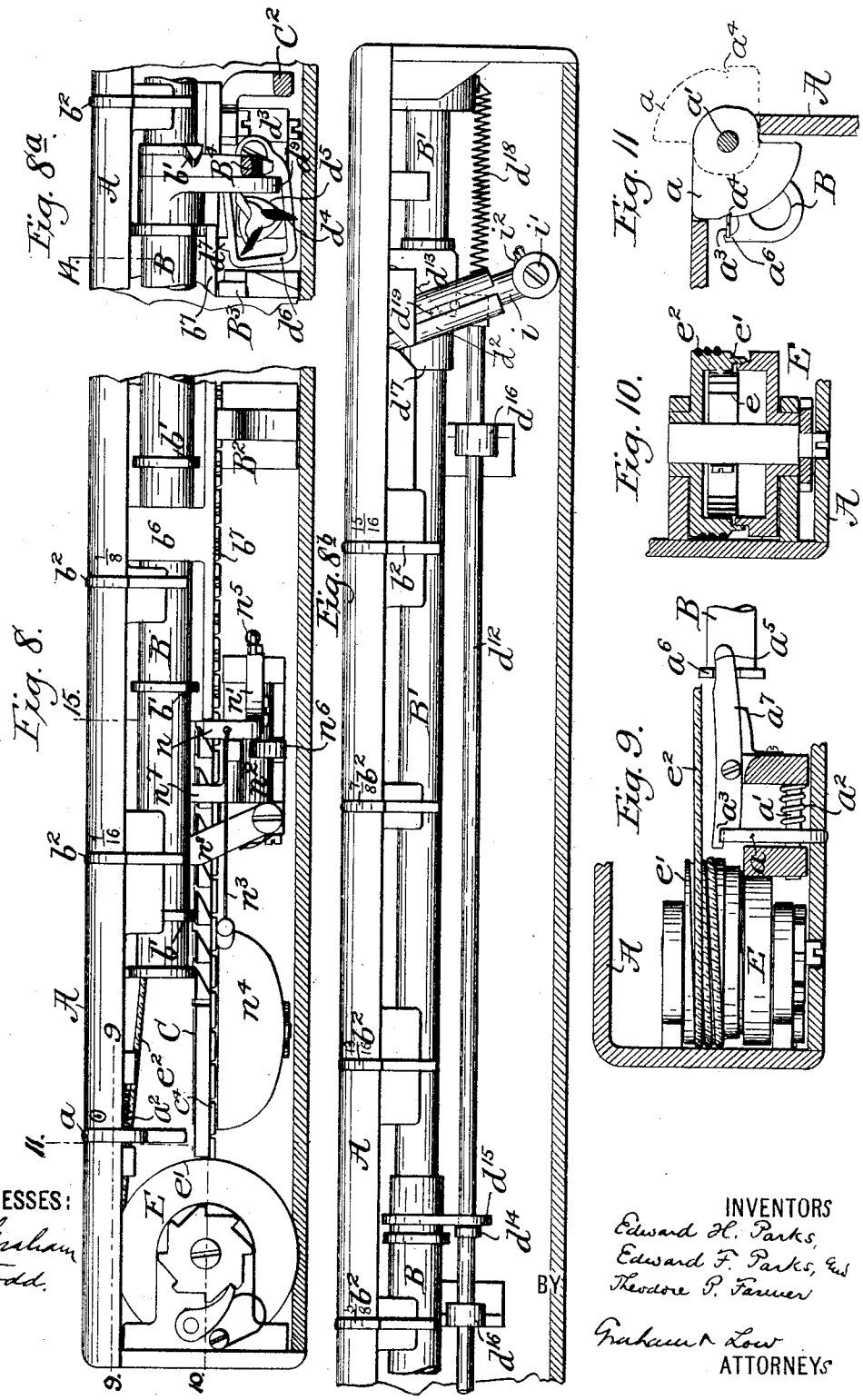

No. 633,102. Patented Sept. 12, 1899.
E. H. & E. F. PARKS & T. P. FARMER.
MEASURING MACHINE.
(Application filed Mar. 17, 1894.)
(No Model.) 13 Sheets—Sheet 4.
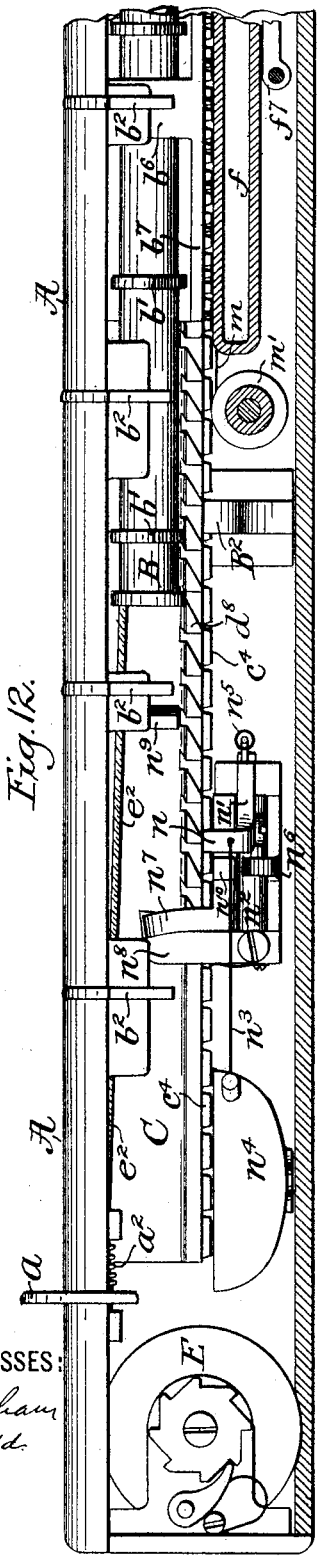
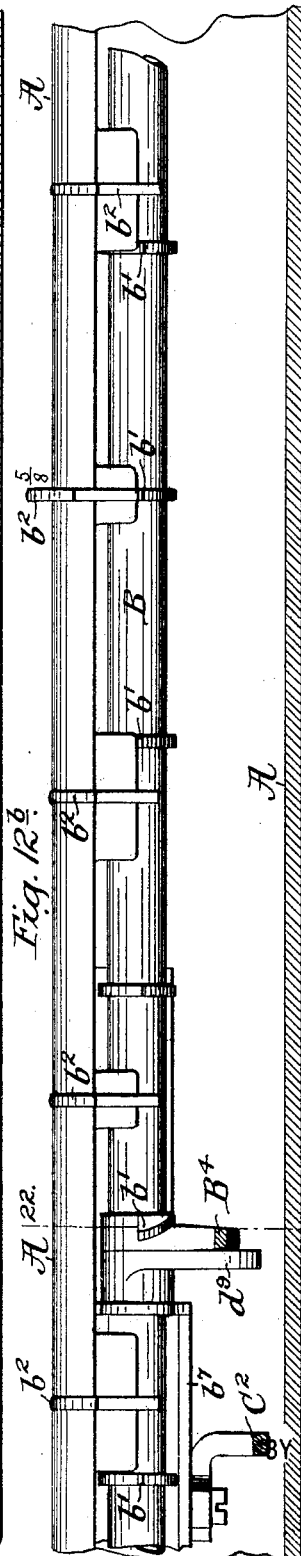
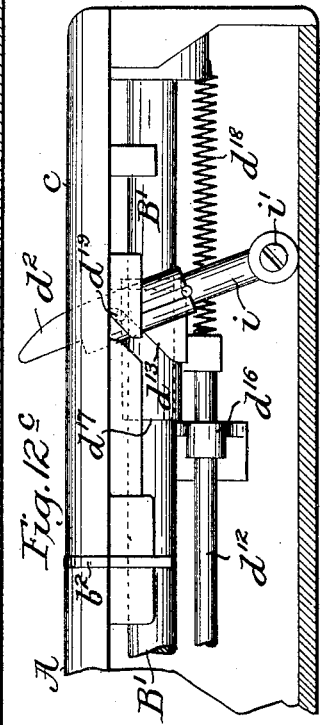
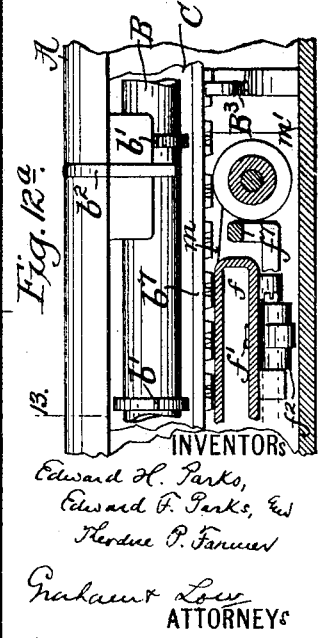

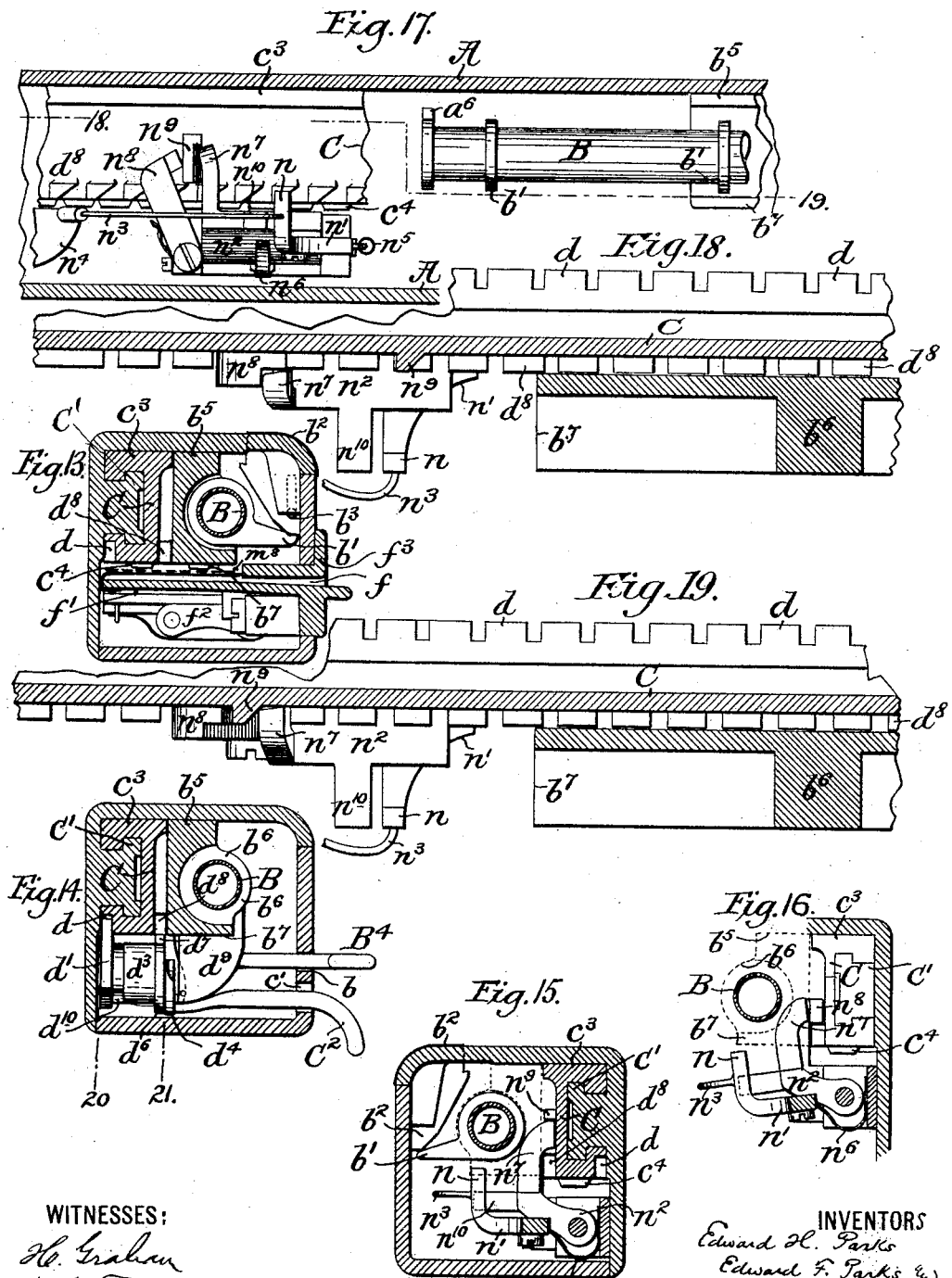

No. 633,102. Patented Sept. 12, 1899.
E. H. & E. F. PARKS & T. P. FARMER.
MEASURING MACHINE.
(Application filed Mar. 17, 1894.)
(No Model.) 13 Sheets—Sheet 6.
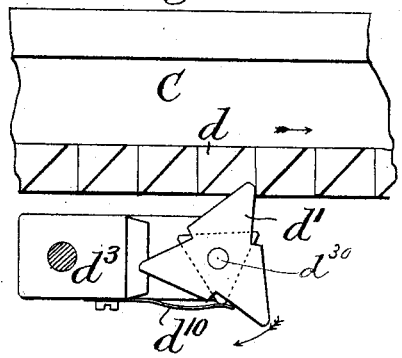
Fig. 20
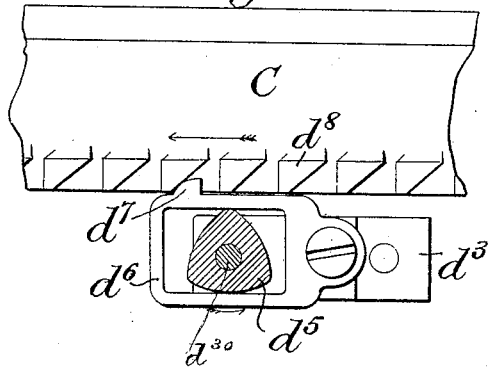
Fig. 21
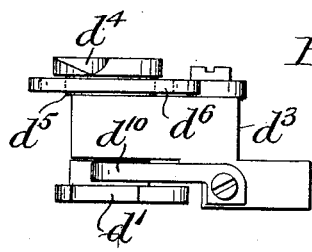
Fig. 22.
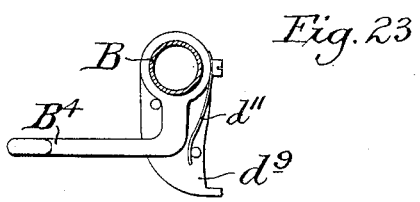
Fig. 23
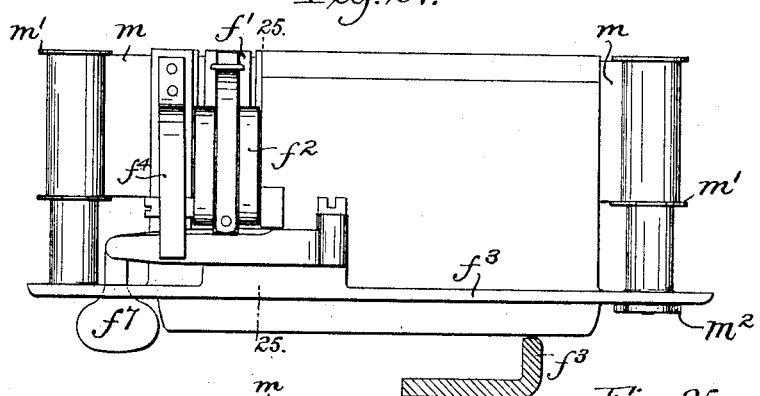
Fig. 24.
Fig. 25.
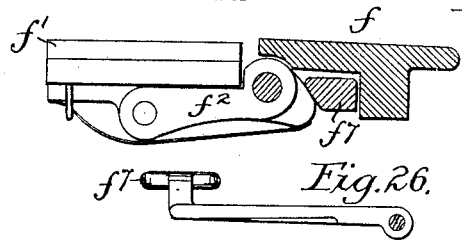
Fig. 26.
WITNESSES:
H. Gilliam
E. L. Todd
INVENTORS
Edward H. Parks
Edward F. Parks and
BY Theodore P. Farmer,
Graham & Low,
ATTORNEYS No. 633,102. Patented Sept. 12, 1899.
E. H. & E. F. PARKS & T. P. FARMER.
MEASURING MACHINE.
(Application filed Mar. 17, 1894.)
(No Model.) 13 Sheets—Sheet 8.

WITNESSES:
H. Graham
E. L. Todd

INVENTORS
Edward H. Parks,
Edward F. Parks,
Theodore P. Farmer,
BY
Graham & Low
ATTORNEYS No. 633,102. Patented Sept. 12, 1899.
E. H. & E. F. PARKS & T. P. FARMER.
MEASURING MACHINE.
(Application filed Mar. 17, 1894.)
(No Model.) 13 Sheets—Sheet 9.
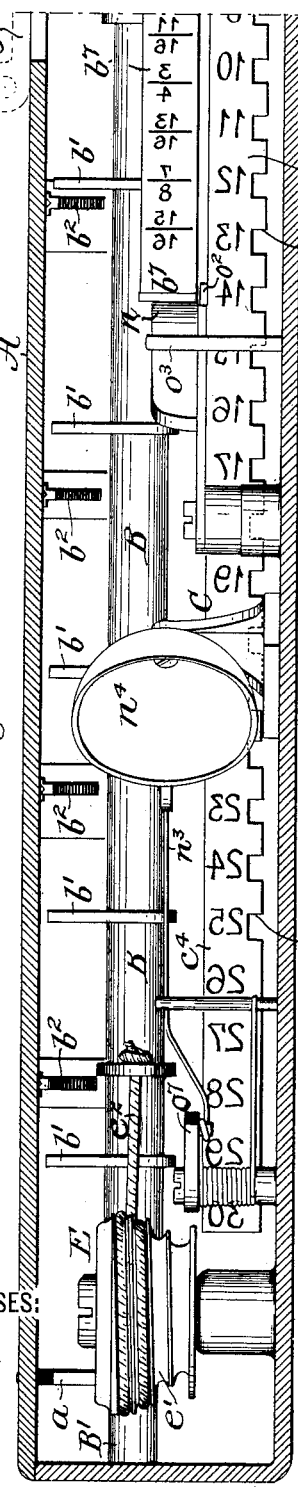
Fig. 32.
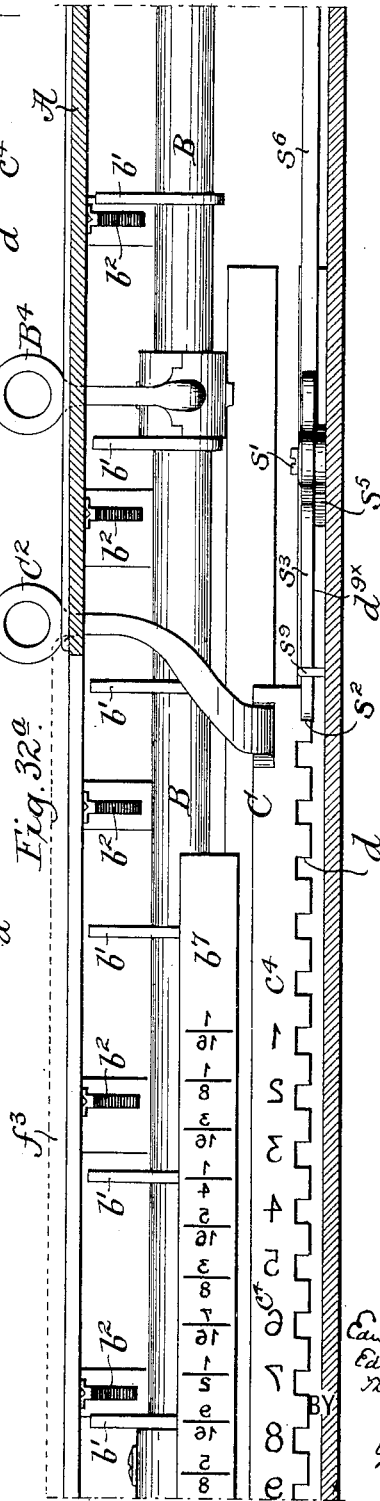
Fig. 32ᵃ.
WITNESSES:
H. Graham
E. L. Todd.
INVENTORS
Edward H. Parks,
Edward F. Parks,
Theodore P. Farmer
BY
Graham & Low,
ATTORNEYS
THE NORRIS PETERS CO., PHOTO-LITHO., WASHINGTON, D. C.

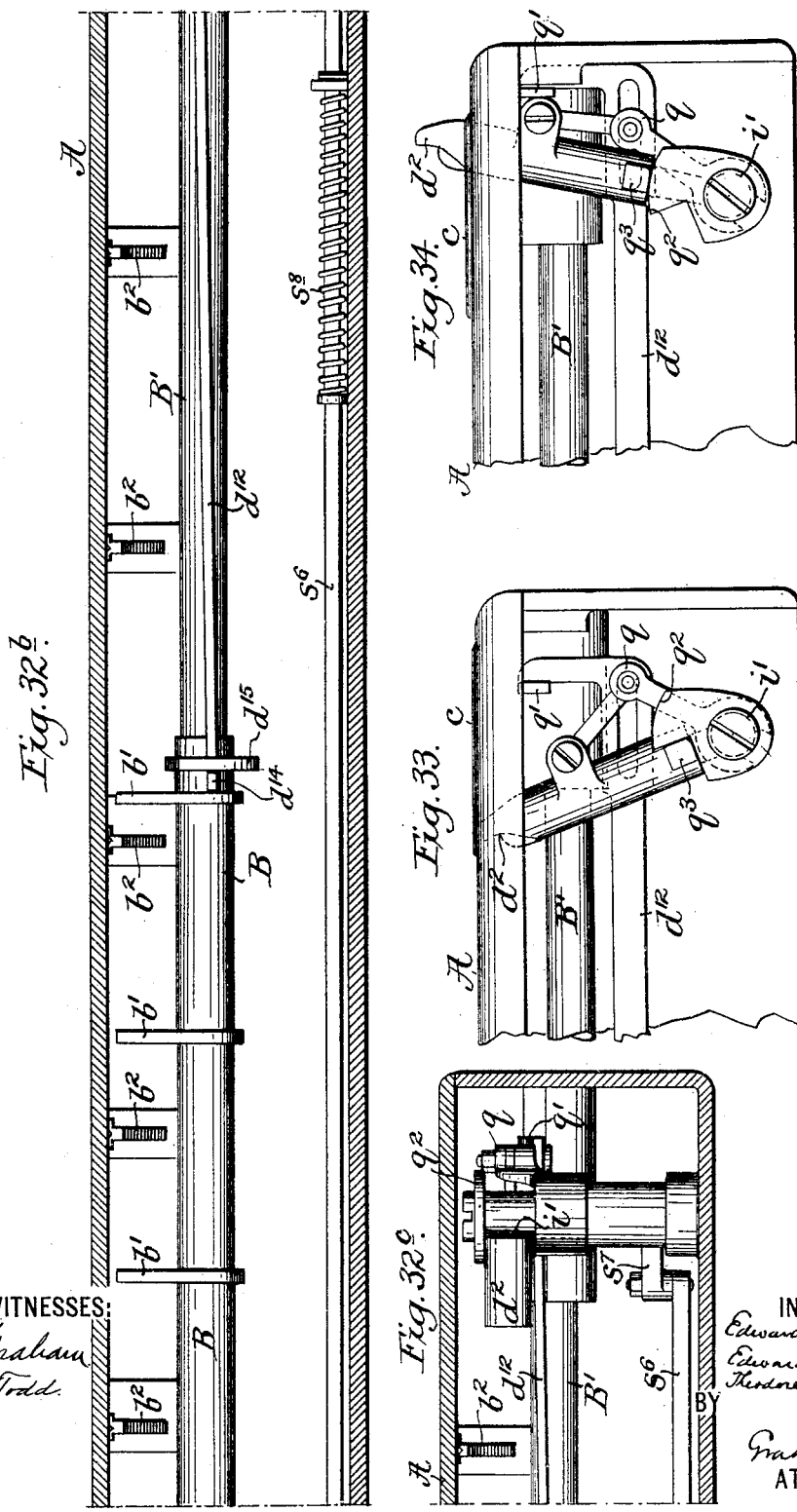

No. 633,102. Patented Sept. 12, 1899.
E. H. & E. F. PARKS & T. P. FARMER.
MEASURING MACHINE.
(Application filed Mar. 17, 1894.)
(No Model.) 13 Sheets—Sheet 11.
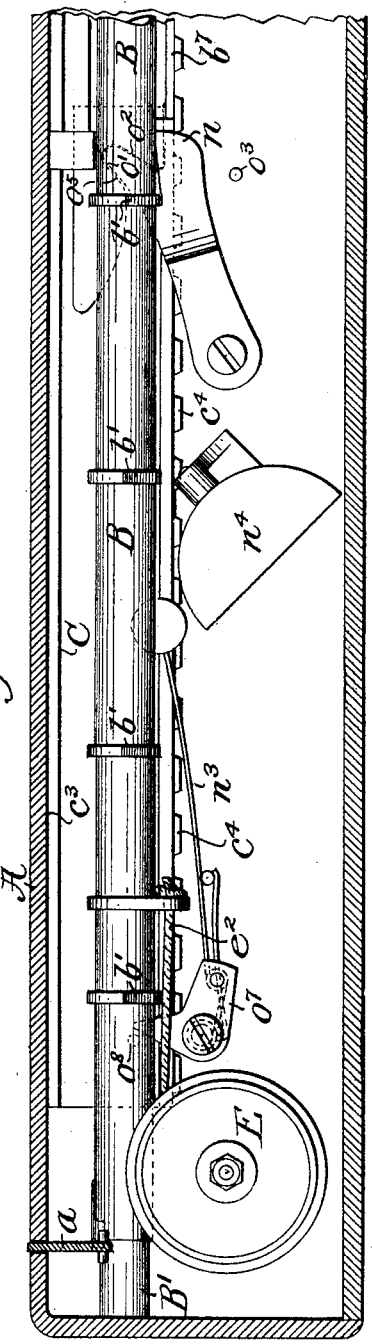
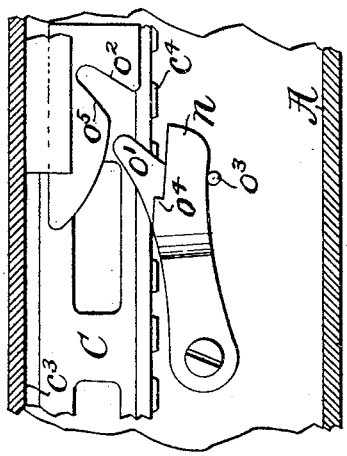
WITNESSES:
INVENTORS
ATTORNEYS No. 633,102. Patented Sept. 12, 1899.
E. H. & E. F. PARKS & T. P. FARMER.
MEASURING MACHINE.
(Application filed Mar. 17, 1894.)
(No Model.) 13 Sheets—Sheet 12.

WITNESSES:
H. Graham
E. L. Todd.

INVENTORS
Edward H. Parks,
Edward F. Parks,
Theodore P. Farmer,
BY
Graham & Low
ATTORNEYS

THE NORRIS PETERS CO., PHOTO-LITHO., WASHINGTON, D. C.

No. 633,102. Patented Sept. 12, 1899.
E. H. & E. F. PARKS & T. P. FARMER.
MEASURING MACHINE.
(Application filed Mar. 17, 1894.)
(No Model.) 13 Sheets—Sheet 13.
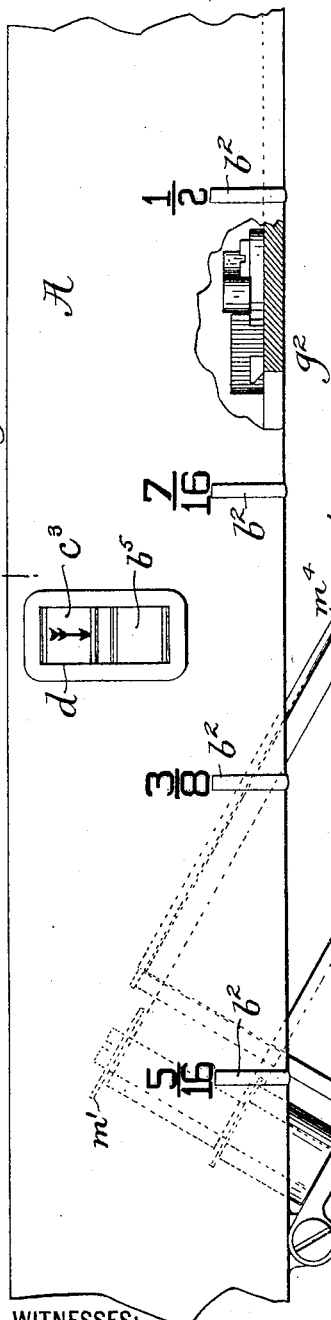
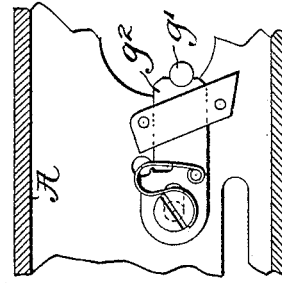
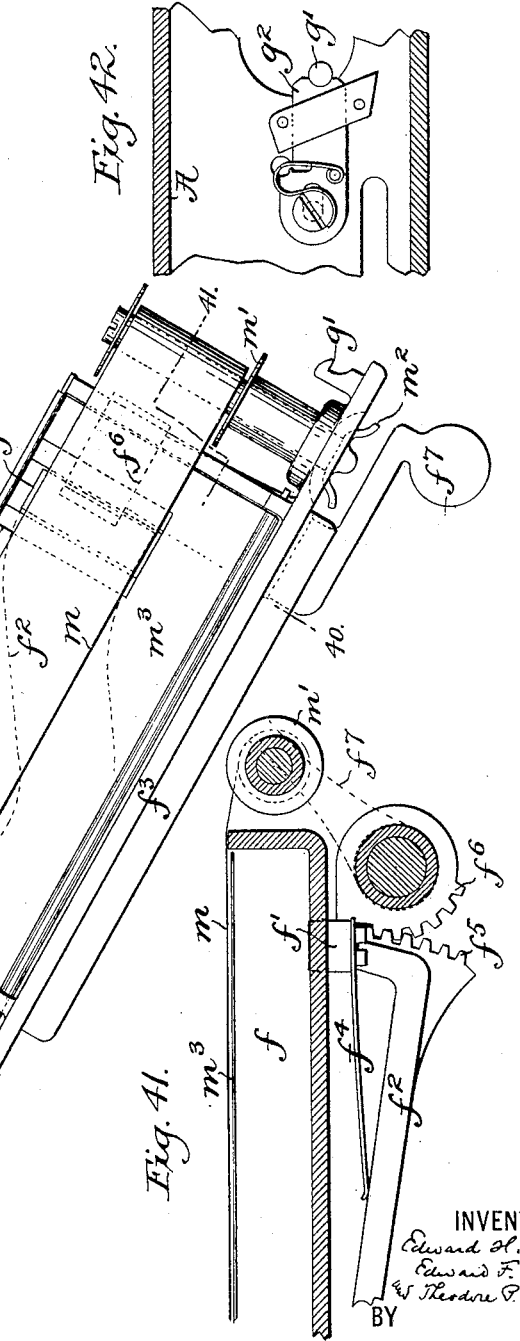
WITNESSES:
H. Graham
E. L. Todd.
INVENTORS
Edward H. Parks
Edward F. Parks
& Theodore P. Farmer
BY
Graham & Low
ATTORNEYS.

UNITED STATES PATENT OFFICE.

EDWARD H. PARKS AND EDWARD F. PARKS, OF PROVIDENCE, RHODE ISLAND, AND THEODORE P. FARMER, OF BOSTON, MASSACHUSETTS.

MEASURING-MACHINE.

SPECIFICATION forming part of Letters Patent No. 633,102, dated September 12, 1899.

Application filed March 17, 1894. Serial No. 504,027. (No model.)

*To all whom it may concern:*

Be it known that we, EDWARD H. PARKS and EDWARD F. PARKS, of the city of Providence, State of Rhode Island, and THEODORE P. FARMER, of the city of Boston, State of Massachusetts, have invented certain new and useful Improvements in Measuring-Machines, of which the following is a specification.

This invention relates generally to measuring devices, and more particularly to that class of such devices that are provided, in addition to the actual measuring-scale, with means to indicate and record the quantity measured or to be measured thereby.

One of the objects of the present improvement is to provide a device—portable, if desired—that may be used for the measurement of goods sold, for instance, in a retail store, whereby the measurements of any fraction of a unit of measurement or any multiples thereof or multiples and fractions may be correctly determined and whereby they may be indicated or recorded, or both, and thereby reduce to the minimum the errors or losses that have heretofore occured in the sale of goods by measurement.

The present invention consists, essentially, of an automatic yard or other measuring instrument having means for determining the number of operations to be performed thereby or thereon, which means are returned to their idle normal positions by the act of performing the predetermined measuring operation.

The measuring instrument may include means for recording or registering the operations to be performed, and may also include an indicator by which the operations to be performed are indicated, the recording means and the indicator being returned to zero in the act of performing the measuring operations.

The instrument may obviously be arranged to measure any units or units and fractions of units of measurement, such as yards and fractions of a yard, and to this end includes a yard stick or scale having a zero point or key and a yard thumb-piece or key, with intermediate keys representing fractions of the yard. The intermediate or fractions keys normally lie in an unexposed position, with their top faces preferably substantially flush with the upper surface of the measuring instrument, and each fractions-key is arranged to be independently moved into an exposed or operative position at the will of the operator, such exposed key being also arranged to return to its normal position in the act of taking the fractional measurement. With the intermediate or fractions keys there may be combined a fractions bar, ribbon, or chain, which when set for any fractions of measurement exposes or raises a fractions-key at the proper point on the scale and which key in the act of measuring may be reset. The fractions-bar when used may also carry a fractions-recorder in the shape of a type-bar, which when the fractions-bar is set to expose a fractions-key has brought into recording or printing line a type corresponding to the fraction of a yard to be measured, so that a record may be taken from such type, and the fractions-bar may also carry or bring an indicator into position to indicate the setting of the fractions-bar. With the yards-key or thumb-piece there is combined a yards bar, ribbon, or chain, which when set to determine the number of yards to be measured may be arranged to bring a yards-recorder in the form of a type bar, ribbon, or chain, with its proper type, into recording or printing line corresponding to the number of yards to be measured, so that a record may be taken from such type, and the yards bar, ribbon, or chain may also carry or bring an indicator into position to indicate its setting.

The fractions-bar and the yards-bar are each provided with a handle by which each bar may be independently moved to be set in proper position, and with either or both bars is combined the zero point or key, which is movable into and out of operative position, so that when one or either of said bars is moved to be set to determine a measuring operation the zero-key may be moved or released so as to automatically move into exposed or operative position, and upon the return of said bars, or either of them, to their normal positions the zero-key is allowed to return to its normal or idle position, and only at such time.

The fractions-bar is automatically returned to its idle or zero position by a motor, which may be in the form of a spring that is placed under tension in or by the act of setting the bar to expose the fractions-key, and the bar is released by the exposed key in the act of making the fractional measurement, so as to return to its idle position, the exposed key being also returned to its idle position in the act of releasing the fractions-bar or in the act of taking the measurement.

The yards-key or thumb-piece is preferably in the form of a disappearing lever which is moved to its exposed position at the time a yard or yards is or are to be measured and disappearing at the completion of the predetermined measurement. While this key may be moved into its exposed position in a variety of ways, it is preferably effected automatically by an action of the counting or tallying device, such as the fractions-bar, which in this case is a movement slightly beyond the idle or zero position of said bar to thereby move a cam or straighten a toggle that lifts the end of the key or thumb-piece into its exposed position, and when the fractions-bar, as soon as the yards measurement is completed, automatically again rests at its zero position the cam is retired or the toggle is bent and the key moved from its exposed position, so that the means of making an additional or false measurement on the instrument is removed from the operator. The yards-key or thumb-piece when exposed lies a little short of the true yard measurement and is moved by the operator in the act of measuring a yard to the yard limit and then automatically returns to its short position under the tension of a spring or by the action of the yards-bar. Each time the yards-key is thus moved it positively, partially or wholly, resets the yards-bar toward or to its normal position, together with its recorder type-bar and its indicator, whereupon the yards-key disappears or is locked against further movement, or both.

The fractions and yards recording type-bars are arranged side by side and move over a platen on which may rest a sales-slip, ticket, strip, or book which may be impressed with the type that is or are in line to print or emboss by moving the platen with the sales-slip against said types, their impress appearing in proper alinement to be read.

With this general understanding of the nature of the improvements a detailed description of one of many forms thereof, with certain modifications, will now be given, reference being had to the accompanying drawings.

Figure 28:
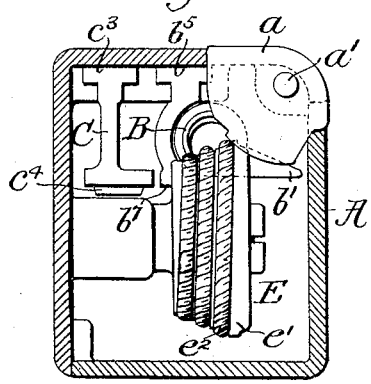
Figure 29:
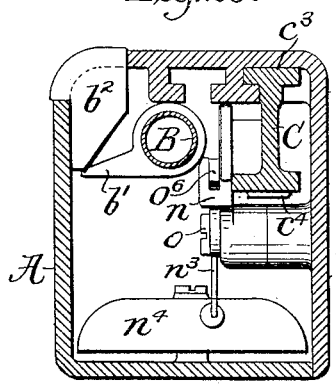
Figure 30:
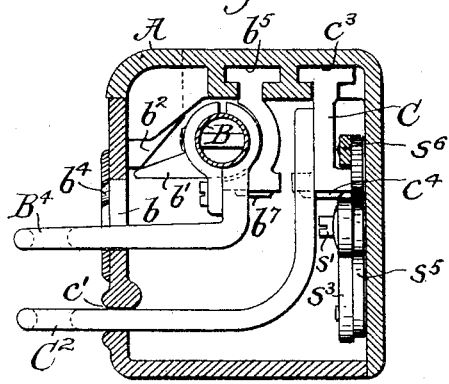
Figure 31:
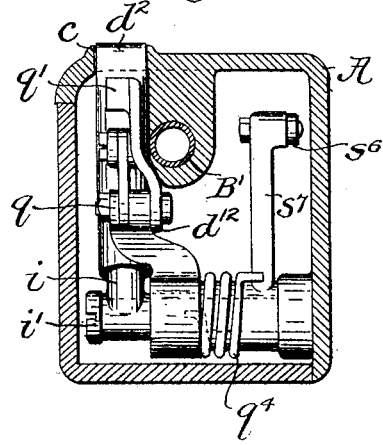

In said drawings, Figure 1 is a perspective view of the exterior of the measuring instrument. Fig. 2 is a perspective view of the left-hand end of the measuring instrument, and Fig. 3 is a similar view of the right-hand end of said instrument. Figs. 4 and 4ª together show a vertical sectional elevation of the measuring instrument, the parts being in the position they occupy after being set to measure, say, five yards and five-eighths. Figs. 5 and 5ª show, respectively, a plan and bottom view of the fractions-bar removed from the instrument, a portion of the bar in each view being broken away on account of its length. Figs. 6 and 6ª show, respectively, a plan and bottom view of the yards-bar removed from the instrument. Fig. 7 is a detached perspective of a portion of the fractions-bar and one of the fractions-keys. Figs. 8, 8ª, and 8ᵇ (enlarged over Figs. 5 and 5ª) together show the major portion of the interior of the instrument in side elevation, the front face of the inclosing case being removed and the parts shown in their normal zero position. Fig. 9 is a horizontal section on the line 9 9 of Fig. 8, showing particularly the motor-drum and zero-key. Fig. 10 is a similar section on the line 10 of Fig. 8. Fig. 11 is a vertical section on the line 11 of Fig. 8. Figs. 12, 12ª, 12ᵇ, and 12ᶜ together show a similar view to Figs. 8, 8ª, and 8ᵇ, the parts being in the position of Figs. 4 and 4ª, the otherwise visible end of a spring $i^2$ being omitted in Fig. 12ᶜ. Fig. 13 is a vertical cross-section on the line 13 of Fig. 12ª looking toward the right of the instrument. Fig. 14 is a like view on the line 14 of Fig. 8ª. Fig. 15 is a like view on the line 15 of Fig. 8 looking toward the left of the instrument, and Fig. 16 is a detail of the parts of Fig. 15 in a changed position. Fig. 17 is a detail elevation of a portion of the parts shown in Fig. 8, the fractions-bar having been moved to the right. Figs. 18 and 19 are enlarged horizontal sections on the lines 18 19 of Fig. 17, showing the yards-bar in its moved and normal positions. Fig. 20 is an enlarged vertical section on the line 20 of Fig. 14, showing the rear of the yards-bar and its actuating toothed wheel. Fig. 21 is a similar section on the line 21 of Fig. 14, looking at the front of the yards-bar; and Fig. 22 is an enlarged bottom view of the actuating-wheel, ratchet, and yoke and their bearing. Fig. 23 is an enlarged section of the fractions-bar, showing particularly the actuating-pawl. Fig. 24 is a bottom view of the impression-platen, ink-ribbon, and the supporting frame or plate removed from the instrument. Fig. 25 is a cross-section on the line 25 of Fig. 24; and Fig. 26 is a detached elevation of the platen operating-lever, looking from the inner side. Figs. 27 and 27ª are together a sectional elevation of a modified form of some of the parts of the instrument, some portions being foreshortened for the want of room, the parts being at their normal positions. Fig. 28 is a vertical cross-section on the line 28 of Fig. 27. Fig. 29 is a like view on the line 29 of said figure, looking in the opposite direction. Fig. 30 is a like view on the line 30, and Fig. 31 a like view on the line 31, of Fig. 27ª. Figs. 32, 32ª, 32ᵇ, and 32ᶜ are together a complete horizontal section of the instrument, looking from the bottom of the instrument, being substantially the same modification as shown in Figs. 27 to 31, inclusive, with the exception of a change in location of the bell-hammer and bell. Figs. 33 and 34 are elevations of the thumb-piece at the right-hand of the instrument in different positions. Fig. 35 is a sectional elevation of a portion of the devices at the left-hand end of the instrument, showing a change in location of the bell-hammer and corresponding to that shown in Fig. 32. Fig. 36 is a detail elevation of the fractions and yards bars stop. Figs. 37 and 37$^a$ are sectional elevations of two distant portions of the instrument, showing the action of the secondary zero-stop and the effect of the movement of the fractions-bar upon the yards-key or thumb-piece at the right of the instrument. Figs. 38, 38$^a$, and 38$^b$ are sectional elevations of the actuating-pawl and its coacting rack of the yards-bar with the pawl in different positions. Fig. 39 is an enlarged plan view of a portion of the exterior of the instrument, partially in section, showing the printer-case and its impression-platen and ink-ribbon devices swung outward from the inclosing case for access. Fig. 40 is a vertical cross-section on the line 40 of Fig. 39 with the impression-platen in its normal position. Fig. 41 is a longitudinal section on the line 41 of Fig. 39, showing the means for operating the platen. Fig. 42 is an elevation looking from the inside of the spring-latch for locking the printer-case in place in the instrument.

The mechanism of the instrument is contained in and supported by a long rectangular inclosing case A—in this particular instance about or a little over a yard, by measurement, in length, and bearing on its upper surface a series of fraction-marks representing fractions of a yard measurement, at one end having a zero point or key $a$ and at the opposite end an opening $c$, adjacent to which the word "yard" appears. This upper surface also has an opening $d^\times$, closed or not by a glass-plate, through which the fractions and yards indicators may be exposed. On the front side of the case there are provided two openings $b$ $c'$, through which project the setting-handles of the fractions and yard bars, hereinafter described, and a third opening $f$, through which the sales-slip, ticket, or book may be entered for receiving the impress from the recording-types. Each extreme end of the inclosing case may have a handle $g$ for carrying the instrument from place to place. The instrument may, however, be set permanently in or on the counter or be carried by a bracket and be adapted for adjustment to different heights.

The interior of the inclosing case supports what, for convenience, may be termed a "fractions-bar" B, Figs. 4, 4$^a$, 5, and 5$^a$, and a "yards-bar" C, Figs. 6 and 6$^a$—they need not be bars in a specific sense—which lie parallel side by side just beneath the upper covering-plate of the case A and are arranged to be moved longitudinally of the case independent of one another to any position within the capacity of the instrument to measure. The fractions-bar B consists, for the sake of lightness, of a long cylindrical tube fitted at one end to slide longitudinally over or on a bearing formed by a supporting guide-rod B', Fig. 4$^a$, rigid with the case A, and is further supported from its under side at points intermediate of its length by brackets B$^2$ B$^3$, projecting from the rear vertical wall of said case. The fractions-bar B has a setting-handle B$^4$, that extends outward through the opening $b$, Fig. 1, in the case A, in position to be grasped by the operator to move the fractions-bar longitudinally. The fractions-bar also has a number of fingers $b'$, Figs. 4, 4$^a$, 5, and 5$^a$, lying unexposed within the case A, that coöperate with a number of movable fractions keys or buttons $b^2$, Fig. 1, which rest in ways cut in the upper horizontal wall of said case, with their upper surfaces normally unexposed or lying flush with the upper surface of the case and along its longitudinal edge. The fractions-keys $b^2$ are arranged at predetermined distances apart according to the particular fractions of the unit of measurement it is desired the instrument shall be capable of measuring—in the present case sixteenths of a yard—so that there are shown fifteen of such fractions-keys, each of which is arranged to be moved independent of the others from its normal or unexposed position to a raised or exposed position. Each fractions-key $b^2$ is formed of sheet metal or other similar material, having a pin $b^3$, Figs. 7 and 13, at one side to enter a vertical guide-slot in the side of the way in which the key works. The fingers $b'$ of the fractions-bar B and the lower ends of the keys $b^2$ are so disposed with respect to one another that the fractions-bar, with its fingers $b'$, may freely move below said keys $b^2$ without being met thereby; but when the fractions-bar is rocked, as will presently appear, one of its fingers $b'$, according to the position to which the fractions-bar has been moved or set, will press against its proper fractions-key and elevate the same to project above the upper surface of the case A, and the fractions-bar, with the elevated key, will remain in such rocked and elevated position by the friction of the shank of the setting-handle impinging against the wall of one or the other of the serrations in an index-plate $b^4$, Fig. 1, mounted along the upper side of the opening $b$, (see Fig. 1,) which serrations correspond in number and in multiple relation to the several fractions-keys in the instrument.

In order to adapt the fractions-bar B and its fingers $b'$ to move the proper fractions-keys $b^2$, said bar is in the nature of a selector, determining by its position or its extent of longitudinal movement the particular fractions-key to be moved, and for this purpose its fingers $b'$ act as selecting-abutments, so disposed along the fractions-bar that when the latter is in any one of its moved positions a finger will have been brought into position to move a particular fractions-key, the other fingers $b'$ being idle or operating idly so far as moving a key is concerned, so that only one key can be moved in any predetermined position of the fractions-bar. Thus, as shown in Fig. 5, the fractions-bar B has as many fingers $b'$ as there are fractions-keys $b^2$, so that in the shortest longitudinal movement of the fractions-bar the first finger (starting from the left hand of the figure) will occupy a position immediately below the first fractions-key $b^2$, while all the remaining fingers $b'$ are out of alinement with all the other fractions-keys, and hence when the fractions-bar B is rocked upwardly, which may be done through the setting-handle $B^4$ just before it is released by the operator after having longitudinally moved the bar thereby, said first fractions-key will be the only one moved, notwithstanding the bar and its fingers are rocked bodily. In like manner if the fractions-bar B be moved longitudinally a distance to bring the tenth finger $b'$ beneath the tenth fractions-key $b^2$ all the other fingers will operate idly when the bar is rocked to move said tenth key to its exposed position, as in Figs. 4 and $4^a$ and Figs. 12 to $12^c$.

The zero position of the fractions-bar B, from and to which position the bar is moved in the measurement of fractions of a yard, is determined by a yard and fractions bar stop $n$, (see Figs. 4, 8, 12, and 15 to 19,) arranged to meet a projection of the fractions-bar, so that its movement to the left when returned from any of its set positions is determined. This stop $n$, however, is arranged at a predetermined time to move out of the way, so that the fractions-bar B may move still farther to the left of its zero position, as will appear hereinafter in describing the means for returning the yards-bar C.

The fractions-bar B (see Fig. 5) carries an indicator in the form of a horizontal plate $b^5$, secured to the bar, so as to move therewith in its longitudinal movements, by means of collars $b^6$, loose on the said bar, which allow the bar to rock without affecting the horizontal position of the indicator-plate. This indicator-plate $b^5$ is arranged immediately below the top horizontal wall of the inclosing case A and is provided along its top surface with indications representing fraction characters corresponding to the fractions indicated on the surface of the case A, which characters are in line with a portion of the opening $d^\times$ in the top of said case, to be exposed therethrough as the fractions-bar B is moved longitudinally, and thus the position of the fractions-bar may be read whether a fractions-key be exposed or not. The fractions-bar B also carries a recorder in the form of a type-faced bar $B^7$, (see Fig. $5^a$,) that is secured to the under side of said fractions-bar through the collars $b^6$, and thus, like the indicator-plate $b^5$, may move bodily with the fractions-bar without partaking of its rocking movement in the act of elevating a fractions-key. The type characters are on the under side of the type-bar $b^7$ and correspond with the fractions the fractions-bar B is designed to measure, and said characters are so arranged that when the fractions-bar is moved to any one of its setting positions ready to expose a fractions-key $b^2$ a type corresponding to such key has been moved over a platen $f'$, (see Figs. 4 and $12^a$,) located in this case on the lower side of the opening $f$ in the inclosing case A, the type characters occupying a position above such opening $f$, so that a sales slip, ticket, or book may be entered through said opening $f$ between the type character that is then in place and the platen $f'$, so that when the platen is moved the sales-slip will be impressed by said type-character.

The fractions-bar B normally occupies a position toward the left-hand end of the inclosing case A, with the end of its type-bar $b^7$ abutting against the stop $n$, as in Fig. 8, which is its normal or zero position, its indicator-plate $b^5$ exposing a blank or "0" through the opening $d$ and its type-bar $b^7$ exposing either no character opposite the platen $f'$ or a simple vertical dash representing zero, so that when the fractions-bar is moved to either one of its setting positions it is drawn by its setting-handle $B^4$ a more or less distance away from its stop $n$ toward the right-hand end of the machine. In any position the fractions-bar B may occupy from its zero position it is designed to be returned automatically in the act of measuring a fraction of a yard by depressing the exposed fractions-key $b^2$, which rocks the fractions-bar bodily to free the shank of its setting-handle $B^4$ from one of the serrations in the index-plate $b^4$ into the unobstructed horizontal slot formed by the opening $b$ in the inclosing case A, in which position of the fractions-bar and its setting-handle, being no longer restrained, said bar returns automatically to its zero position against the stop $n$ toward the left hand of the case A. To effect this automatic return of the fractions-bar B, it is connected to a motor E, Figs. 4 and 8, in the form of a coiled spring $e$, (see Figs. 9 and 10,) which is connected to the fractions-bar to be placed more or less under tension as the said fractions-bar is moved toward the right of the inclosing case A, so that said spring will be in condition to quickly return the fractions-bar to its zero position as soon as released by the depression of the exposed fractions-key $b^2$ no matter which of the keys that may be. The motor-spring $e$ is contained within a hollow winding-drum $e'$, mounted within the inclosing case A, at the extreme left-hand end, said drum being connected by a cord $e^2$ with the left-hand end of the fractions-bar. As the construction and operation of this spring winding-drum are of common knowledge and any usual construction being adapted for use with the improved instrument, no detailed description of the one chosen for illustration need be given. Of course any other form of motor may be employed to return the fractions-bar B to its zero position, the spring-winding-drum form being especially compact and efficient for the purpose.

The zero point or key $a$ at the left of the inclosing case A is preferably a movable one arranged to be automatically exposed whenever either one of the bars B C is moved to its setting position. For this purpose the zero-key $a$ is mounted in a slotted way in the inclosing case A on a pivot $a'$ to rock from its depressed or unexposed position—say with its upper edge flush with the top surface of the inclosing case, as in Fig. 11—to an elevated or exposed position, as indicated by dotted lines in said figure. The pivot $a'$ of the zero-key carries a spring $a^2$, (see Fig. 9,) which constantly tends to hold said key in its elevated position, and there is provided a spring-pressed locking-detent $a^3$, one end of which engages with a notch $a^4$ to hold the zero-key in its depressed position, the other end of said detent borne upon by the spring $a^7$ and having a cam $a^5$, that is engaged by a projection $a^6$ on the end of the fractions-bar B. The cam $a^5$ at the end of the detent $a^3$ is arranged so that a movement of the fractions-bar B in either direction will rock the detent to free the zero-key $a$. In one direction said detent is rocked as the fractions-bar is moved from the zero position to the right to be set in one of its positions and in the other direction it is rocked as said fractions-bar is moved slightly to the left from the zero position, this latter movement to be hereinafter explained.

The yards-bar C, like the fractions-bar, normally occupies a position toward the left of the inclosing case A and is arranged to be moved longitudinally to any one of its setting positions toward the right of said inclosing case through the medium of a setting-handle $C^2$, attached thereto and projecting through the longitudinal opening $c'$ in the front of the inclosing case. The yards-bar C is normally supported upon a longitudinal guide $C'$, (see Figs. 13 to 16,) projecting inward from the vertical rear wall of the inclosing case A, and, like the fractions-bar B, carries on its upper side an indicator in the form of an indicator-plate $c^3$, (see Fig. 6,) bearing on its upper surface yard indications to be exposed through the opening $d^\times$ in the inclosing case and on its lower side with a type-faced bar $c^4$, (see Fig. 6$^a$,) bearing on its under side type-numerals representing the yards the instrument is capacitated to measure, which types are presented in position above the platen $f'$ to be impressed upon the sales slip, ticket, or book presented through the opening $f$. The indicator-plate $c^3$ lies alongside of the other indicator-plate $b^5$, so that both the yards and fractions indications are presented side by side and exposed through the common opening $d^\times$, and the type-bar $c^4$ lies alongside of and on the same plane with the other type-bar $b^7$, so that both the yards and fractions recorders are presented side by side above the common platen $f'$.

In the zero position of the yards-bar C toward the left hand of the instrument and defined by the abutment of the shank of its setting-handle $C^2$ meeting the end wall of its longitudinal opening $c'$ in the inclosing case A the indicator-plate $c^3$ exposes a zero-mark through the opening $d^\times$ and the type-bar $c^4$ a similar type or blank space over the platen $f'$, and as the yards-bar is moved longitudinally to the right of the instrument the several indications and type characters will move successively, one beneath the opening $d^\times$ and the other above the platen $f'$, until said yards-bar is moved a sufficient distance to bring the desired indication of the number of yards to be measured to view through said opening $d^\times$ and likewise a like type character above the platen.

The movement of the yards-bar C from its normal or zero position is made the means of temporarily removing the stop $n$ of the fractions-bar B from the operative position, so that should said fractions-bar not have been moved it will thereupon move under the tension of its motor-spring $e'$ slightly farther to the left of the instrument, and likewise should the fractions-bar have been moved to one of its set positions it will return when released to such extreme left position unobstructed by its stop $n$ for a purpose that will hereinafter appear. The stop $n$ (see Figs. 15 to 19) is formed by the upper right-angular bent end of the bell-hammer bell-crank $n'$, that is pivoted to a horizontal arm $n^2$, and carrying at one end the bell-hammer $n^3$ for striking the bell $n^4$ and at the opposite end engaged by a spring $n^5$, holding the bell-hammer off the bell. The rock-arm $n^2$ is pressed upwardly by the spring $n^6$, which tends to keep the zero-stop $n$ in the path of the fractions-bar B to limit its movement and also tends to hold a finger $n^7$, projecting from the rock-arm, against or toward the side of the yards-bar C. The yards-bar carries an inclined projection $n^9$, which in the zero position of said yards-bar, Figs. 17 and 19, occupies a position just to the left of the finger $n^7$ of the rock-arm $n^2$, allowing the end of said finger to lie close to the side of the yards-bar, Fig. 15, with the rock-arm $n^2$ in its highest position, and the stop $n$ for the fractions-bar B in operative position to limit the return of the fractions-bar to its normal zero position. In this position of the projection $n^9$ it bears upon and rocks rearwardly a spring-pressed finger $n^8$, that is pivoted to the inclosing case A and extends upward alongside of the yards-bar. This finger $n^8$ has a forward extension, the outward surface of which lies in the same vertical plane as the projection $n^9$, so that when the yards-bar C is moved to the right in the act of being set its projection $n^9$ passes the end of the rock-arm finger $n^7$, rocks it to one side sufficient to allow the extension of the finger $n^8$ immediately following the projection $n^9$ under the pressure of its spring to become interposed between said finger $n^7$ and the yards-bar, Fig. 18, and in this way the zero-stop $n$ has been rocked out of the path of the return movement of the fractions-bar B, Fig. 16, and is held out of such path until the yards-bar, with its projection $n^9$, is returned to the left sufficient to rock the finger $n^8$ from the rear of the rock-arm finger $n^7$, so that after the projection $n^9$ passes beyond the said finger $n^7$ the rock-arm $n^2$ will rock back to its normal position, returning the zero-stop $n$ again in the path of return movement of the fractions-bar, from which it will appear that so long as the yards-bar C remains in its normal zero position the stop $n$ for the fractions-bar B remains in its operative position and that as soon as the yards-bar C is moved from its zero position and until it is returned to such position the stop $n$ is moved from operative position. A much simpler form of stop $n$ will be hereinafter described, and hence, so far as this part of the invention is concerned, the details of construction may be varied considerably.

The yards-bar C, unlike the fractions-bar B, is preferably returned from either one of its set positions by a step-by-step movement imparted thereto by an actuating device, the hand-operative portion of which is arranged to extend through the opening $c$ at the right-hand end of the inclosing case A. Each backward step of the yards-bar imparted by the actuating device in this embodiment represents a yard in measurement, so that the yards-bar were be moved as many steps backward to its zero or normal position as its set position represents yards. Thus if the said yards-bar were set to measure seven yards the actuating device would be operated seven times, imparting seven distinct backward step movements to the yards-bar to return it to its normal position. In employing a fractions-bar B, whose measuring functions are independent of the yards-bar, it is preferred in practice to measure the fractions of the yards first, so that the fractions-bar is returned to zero before the yards are measured, and in such case it is also preferred to make the return of the fractions-bar to zero the means of rendering the actuating device for the yards-bar operative; and, on the other hand, if there be no fractions to be measured the yards-bar, being moved to one of its set positions, will also render the said actuating device operative through the medium of the fractions-bar, which is allowed to move to the left of its normal position, as will hereinafter appear.

The yards-bar-actuating device consists briefly of a rack $d$, a reciprocating pawl $d^9$, and an operating yards-key or thumb piece or lever $d^2$, with such suitable connections as may be needed in transmitting the movements of the hand-operated thumb-piece to the yards-bar C to return the latter to its zero position. Normally and in the preferred construction the operating thumb-piece $d^2$, which is arranged to project through the inclosing-case opening $c$, lies with its upper end about flush with the upper surface of the inclosing case, so that the operator is unable to move it, but which at the proper time is extended upward a suitable distance in position to be moved by the operator. For this purpose the thumb-piece $d^2$ is sleeved to slide upon a rod $i$, (see Fig. 8$^b$,) that is mounted to rock with the thumb-piece on a horizontal stud $i'$, projecting from the rear vertical wall of the inclosing-case A. A coiled spring $i^2$, if desired, may tend to keep said rod and thumb-piece inclined toward the left of the instrument. The sleeved portion of the thumb-piece $d^2$ normally occupies its low or unextended position on the rod $i$ and is guided when projected or extended outward by a pin on the rod entering a slot in the sleeve. The means for automatically projecting the thumb-piece $d^2$ into operative position are brought into action by the fractions-bar B in moving slightly to the left beyond its zero position upon the removal of its stop $n$, and consists of an inclined shoulder $d^{13}$, Figs. 8$^b$ and 12$^c$, which when moved to the left and engaging a pin $d^{19}$ on the side of the thumb-piece $d^2$ slides said thumb-piece on its rod $i$ and projects it above the surface of its opening $c$. The inclined shoulder $d^{13}$ in this embodiment is carried by a sleeve $d^{17}$, that is mounted to slide freely on the fixed guide-rod B′, the sleeve $d^{17}$ being connected to the right-hand end of a longitudinal rod $d^{12}$, the opposite end of which rod $d^{12}$ carries a collar $d^{14}$, arranged to engage a projection $d^{15}$ on the fractions-bar B, a spring $d^{18}$, connected to the rod $d^{12}$, normally holding said rod and the inclined shoulder $d^{13}$ to the right, with the inclined shoulder out of operative position, allowing the thumb-piece $d^2$ to rest at its low inoperative position on the rod $i$. The longitudinal rod $d^{12}$ is supported other than the support afforded to the sleeve $d^{17}$ by the fixed guide-rod B′ by a pair of brackets $d^{16}$, projecting from the rear vertical wall of the inclosing case A, sufficient room being afforded between the collar $d^{14}$ on said longitudinal rod and one of the brackets to allow the longitudinal rod to reciprocate to the left and back again to its normal position under the tension of said spring $d^{18}$. Sufficient room is also afforded between said collar $d^{14}$ and the other bracket $d^{16}$ for the projection $d^{15}$ to move with the fractions-rod B to the limit of the stroke of the fractions-rod from the zero position without obstruction and without meeting the collar $d^{14}$ to slide the longitudinal rod $d^{12}$. When the fractions-bar B is allowed to move backward beyond its zero-stop $n$ under the tension of its motor-spring $e$, as before explained, its projection $d^{15}$ engages the collar $d^{14}$, and thus the longitudinal rod $d^{12}$ and the inclined shoulder $d^{13}$ are moved to the left with the fractions-bar, and this movement is sufficient to have caused the inclined shoulder $d^{13}$ to have raised the thumb-piece $d^2$ into operative position, as in Fig. 12$^c$. In addition to moving the thumb-piece $d^2$ into operative position the longitudinal rod $d^{12}$, with its collar $d^{14}$ and inclined shoulder $d^{13}$, forms the means of connecting the operating thumb-piece $d^2$ with the fractions-bar for reciprocating it to impart movements to the pawl $d^9$ for returning the yards-bar C to zero. The pawl $d^9$ in this instance operates a revoluble wheel $d'$, (see Fig. 20,) that in turn engages with the rack $d$, that is formed on the rear side of the yards-bar C, the rack having as many teeth as the instrument is designed to measure yards. The pawl $d^9$ is reciprocated back and forth by the finger-piece $d^2$, and each reciprocation moves the wheel $d'$ a distance sufficient to impart a single backward step movement to the yards-bar C.

The revoluble wheel $d'$ is a three-toothed wheel mounted to rotate in a fixed bearing $d^3$ on the vertical rear wall of the inclosing case A immediately below the yards-bar. (See Figs. 4, 8$^a$, 14, 21, and 22.) The pin $d^{30}$, to which the wheel $d'$ is fixed, carries at its outer end a three-toothed ratchet-wheel $d^4$ and a cam $d^5$, a flat spring $d^{10}$ bearing against the polygonal hub of the wheel $d'$, holding said wheel and the ratchet-wheel and cam in their moved positions. The cam rotates within and rocks a yoke $d^6$, that is pivoted at one end to the bearing $d^3$ and carries a locking-tooth $d^7$, engaging a toothed rack $d^8$, formed on the outer lower side of the yards-bar C and having the same number of teeth as the rack $d$, the teeth of the two racks being inclined in opposite directions and alternating one with the other. With the ratchet-wheel $d^4$ and the immediate means for rotating the ratchet-wheel, cam $d^5$, and wheel $d'$ is the pawl $d^9$, (see Fig. 23,) which in this instance is carried by the fractions-bar B alongside of its setting-handle B$^4$, the pawl $d^9$ being movable bodily with the fractions-bar, but hung loosely thereon to yield outwardly against the pressure of a spring $d^{11}$ as the inclined end of the pawl passes idly in one direction to the left over the inclined surface of a tooth of the ratchet-wheel $d^4$, so that in the forward direction to the right of the fractions-bar and the pawl $d^9$ said pawl will engage a tooth of the ratchet-wheel $d^4$ and will rotate it and the cam $d^5$ and the wheel $d'$ simultaneously a single step, thereby positively moving the yards-bar C backward one step to the left. By mounting the pawl $d^9$ on the fractions-bar B said bar forms one of the intermediate connections between said pawl and the finger piece or lever $d^2$ for moving the yards-bar C backward to zero, the remaining connection immediate to the thumb-lever $d^2$ being formed by the longitudinal rod $d^{12}$ and its connections before described.

From the foregoing it will be understood that upon the forward vibration of the operating thumb-piece $d^2$ toward the right the pin $d^{19}$, bearing rigidly against the high part of the inclined shoulder $d^{13}$, reciprocates said shoulder, the longitudinal rod $d^{12}$, the fractions-bar B, and the pawl $d^9$ bodily also toward the right against the tension of the motor-spring $e$, the reciprocation being limited by the length of the opening $c$, which limits the vibration of said thumb-piece $d^2$, having rotated the ratchet-wheel $d^4$ and wheel $d'$ one step and sufficient to have moved the yards-bar C backward one step, the return idle vibrations of the thumb-piece $d^2$ and the return idle reciprocations of the fractions-bar, the pawl $d^9$, and intermediate connections being effected by the motor-spring $e$, bringing the pawl $d^9$ again to the left of the ratchet-wheel $d^4$ in position to again cause a backward step movement of the yards-bar when the thumb-piece is again vibrated to the right. These operations of the thumb-piece $d^2$ and the pawl $d^9$ will continue until the yards-bar has been returned to its zero position, whereupon the stop $n$ will have been restored to its operative position ready to stop the fractions-bar on its idle return reciprocation under the force of its motor-spring $e$ at its proper zero position. In doing so the pawl $d^9$ is stopped short of passing idly over the ratchet-wheel $d^4$, as in Fig. 8$^a$, and the projection $d^{15}$ fails to move the longitudinal rod $d^{12}$ sufficiently to the left to keep the inclined shoulder $d^{13}$ to duty against the pin $d^{19}$, in consequence of which the shoulder remains at rest in its right-hand position, and the thumb-piece $d^2$, not being supported by the shoulder $d^{13}$, falls by gravity to its inoperative position on its rod $i$ simultaneous with the idle vibrations of the thumb-piece to its normal left position in the opening $c$. As the stop $n$ is moved to its operative position on the forward stroke of the fractions-bar B, it results that in the return of the fractions-bar it will strike such stop with sufficient force to vibrate the bell-hammer $n^3$ to strike the bell $n^4$, and thus in addition to the disappearance of the thumb-piece $d^2$ indicate audibly the completion of the measurement. If fractions alone are measured, the stop $n$ not having been moved from operative position, the sudden return of the fractions-bar B will likewise cause the bell-hammer to strike the bell. If fractions and yards are to be measured, the sudden return of the fractions-bar B upon measuring the fractions will not cause the striking of the bell, as the stop $n$ is not then in position to be struck by the fractions-bar.

The impression-platen $f'$ (see Figs. 4, 12$^a$, 13, and 24 to 26) is pivotally connected to a carrying-lever $f^2$, that in turn is pivoted to a carrier-frame $f^3$, removably connected to the inclosing case A, the frame providing the ticket or book receiving opening $f$. The lever $f^2$ is provided with a short projection arranged to be met by the operating-lever $f^7$, the finger-piece of which extends to the outside of the carrier-frame $f^3$ and the inclosing case A, so as to be depressed by the operator against the pressure of a spring $f^4$ in the act of elevating the platen $f'$ to effect the impression of the type-bars $b^7$ and $c^4$, Fig. 13. The platen $f'$ is pivoted to the carrying-lever $f^2$ to enable it to accommodate itself to the change in position of said lever $f^2$, so as to obtain an even impression. The impression upon the ticket or book is had preferably by an ink-ribbon $m$, mounted upon a pair of spools $m'$, supported at each end of the frame $f^3$, one of the spools having an exterior thumb-wheel $m^2$ to rotate it to feed the ribbon along a step. The ink-ribbon $m$, between the spools $m'$, moves over a guard $m^3$, which prevents contact of the ticket or book with such ribbon except at the point immediately above the platen $f'$, which is slotted to permit the book to be impressed at the time of impression, as is more freely shown and described with reference to Fig. 39. The carrier-frame $f^3$ supports the platen and its operating devices and also the ink-ribbon, and by making it removable from the inclosing case A enables the whole to be detached for inspection and for renewing the ink-ribbon.

The operations of the several parts have already been set forth in detail; but it may be stated that in the use of the improved measuring instrument the operator sets the fractions and yards bars B and C to positions which will show the amount to be measured through the indicator-opening $d$ and will print the same amount on the sales slip, ticket, or book upon operating the platen $f'$. The setting of the fractions-bar will have released the zero-key $a$, so that it stands exposed, and will have also moved the proper fractions-key $b^2$ to its exposed position, the yards-bar-operating thumb-piece $d^2$ not yet being exposed. The operator then takes the cloth, ribbon, or other goods to be measured which rests on the counter at the left of the instrument and leads it over the zero-key $a$ until the forward end of the cloth is brought to the exposed fractions-key $b^2$, whereupon he grasps the cloth stationed at the zero-key with the left hand and with his right hand holding the end of the cloth depresses said fractions-key, and thus effects the return of the fractions-bar B, which, as before stated, causes the operating thumb-piece $d^2$ to move to its exposed position. The operator having measured the fraction of a yard just as he would in using the ordinary yard-stick or marked counter edge, releases the forward end of the cloth and grasps the cloth with his right hand at the point where it is being held at the zero-key, releases his left hand, and moves his right hand with the cloth to the right to the exposed thumb-piece $d^2$, drawing the remainder of the cloth over the zero-key. He then presses the cloth against said thumb-piece and vibrates it to the limit of its stroke, having thereby moved the yards-bar C backward one step, and with his left hand grasps the cloth taut at the point where it overlies the zero-key, the distance between the vibrated thumb-piece and the zero-key being one yard. He now releases his right hand, thereby allowing the thumb-piece $d^2$ to vibrate back to its left-hand position, and if the other yards are to be measured said thumb-piece remains in its exposed position, and he again grasps the cloth with his right hand at the zero-key, releases his left hand, and drawing the cloth to the right against the thumb-piece, vibrating it and again grasping the cloth overlying the zero-key with his left hand, having measured the second yard, repeating the operation of moving the cloth over the instrument and vibrating the thumb-piece until said thumb-piece $d^2$ disappears or moves from operative position and the bell is struck, indicating that the amount the instrument was set to measure has been measured.

In the modification shown in Figs. 27 to 42, inclusive, some of the parts have been simplified and the instrument rendered somewhat more efficient. The general construction and arrangement of the several devices remain the same as those previously described and are marked with similar reference-letters, so that the description already given applies equally to the modified construction except in the particulars hereinafter fully pointed out.

The fractions-bar B is mounted at both ends to slide on a fixed guide-bar B', the intermediate brackets $B^2$ $B^3$ being dispensed with. The stop $n$ for the fractions-bar consists of a weighted arm pivoted at $o$ to the vertical back plate of the inclosing case A. (See Figs. 27, 29, and 35 to 37.) It has an upwardly-extending finger $o'$ extending alongside of the yards-bar C, which latter carries a cam $o^2$, which when the yards-bar is in its zero position holds the stop $n$ in position to stop the fractions-bar at its zero by meeting the end of the type-bar $b^7$, as before. As soon as the yards-bar is moved to the right the cam $o^2$ in leaving the stop $n$, as in Fig. 36, allows said zero-stop to fall by gravity against a stop-pin $o^3$, in which position of the zero-stop the fractions-bar B may move from its zero position farther to the left under the pull of its motor-spring $e'$, as before described, and thus have caused the elevation or exposure of the operating thumb-piece $d^2$ for the yards-bar in a similar manner as before, but by means of a modified construction to be described. The zero-stop $n$, however, may be provided with a secondary stop $o^4$, (see Figs. 36 and 37,) which when the zero-stop is in its down position is in position to form another limit to the extreme left-hand position of the fractions-bar B by meeting the end of the type-bar $b^7$. When the yards-bar C approaches its zero position on completing its measuring function, the cam $o^2$ comes against the finger $o'$ of the zero-stop $n$ and elevates it in position ready to stop the fractions-bar B at its normal zero position. The cam $o^2$ is supplemented by an incline $o^5$, which as the yards-bar is moved to the right acts against the finger $o'$ to force the zero-stop to its down position should it fail to drop by gravity. In one instance the bell-hammer $n^3$ (see Figs. 27 and 29) is mounted on the pivot $o$ of the zero-stop $n$ and is provided with an arm $o^6$, which extends alongside of the zero-stop with its end resting upon the bottom of a bifurcation on the side of the zero-stop. The dropping movement of the zero-stop $n$ will have no effect on the arm $o^6$ to vibrate the bell-hammer $n^3$; but when said arm is in its raised position and is suddenly struck by the fractions-bar the bell-hammer will be sufficiently vibrated to strike the bell $n^4$, and this will also occur when the yards-bar C has been moved simultaneous with the return of the yards-bar to its zero position. In the other instance of the same form of zero-stop $n$ (see Figs. 32 and 35) the bell-hammer $n^3$ is entirely independent of the zero-stop and is carried by one arm of a bell-crank $o^7$, the other arm of said bell-crank being in position to be struck by a pin $o^8$, projecting from the side of the yards-bar C, in which case the bell $n^4$ will be struck only on the return of the yards-bar.

The modified means, as will presently appear, for elevating the thumb-piece $d^2$ include, as before, a rod or bar $d^{12}$, extending longitudinally at the right of the instrument and below the fractions-bar B. When the fractions-bar B moves to its extreme left-hand position, say against the secondary zero-stop $o^4$, (see Figs. 37 and 37$^a$,) its depending arm $d^{15}$ meets the shoulder or bent end $d^{14}$ of the rod $d^{12}$ and carries said rod longitudinally to the left. Instead of moving a cam to elevate the thumb-piece $d^2$, the right-hand end of the rod $d^{12}$ is slotted to embrace the middle joint of a toggle $q$, one arm of the toggle being mounted on the pivot $i'$ and the other arm connected to the vertically-sliding portion of the thumb-piece $d^2$. When the toggle is bent and in its normal position, as in Fig. 27$^a$, the thumb-piece $d^2$ occupies its depressed or unexposed position; but when the rod $d^{12}$ is moved to the left by the extreme left movement of the fractions-bar B the toggle is straightened and the thumb-piece $d^2$ thereby elevated or projected through its opening $c$ in position to be actuated by the hand of the operator, as before, as in Fig. 37$^a$. The extreme right-hand end of the rod $d^{12}$ is provided with a bearing-piece $q'$, which takes the thrust of the thumb-piece $d^2$ as it is vibrated to the right, as in Fig. 34, and thus communicates its movement to the fractions-bar through the arm $d^{15}$. As it is not desirable to depend on the holding of the finger-piece $d^2$ in its elevated position by the constant straightening of the toggle $q$ or by the constant action of the incline or cam $d^{13}$ in the previously-described construction, there is provided a guard $q^2$, (see Figs. 33, 34, and 37$^a$,) fixed at the side of the thumb-piece $d^2$, with which coacts a projection $q^3$ on the lower end of the sleeved portion of the thumb-piece, which guard $q^2$, as soon as the thumb-piece $d^2$ is elevated and is started to be vibrated, as in Fig. 37$^a$, is in position to underlie the projection $q^3$ and hold the thumb-piece in its elevated position during its vibrating movement, as in Fig. 34. As soon as the thumb-piece $d^2$ returns to its left-hand position the projection $q^3$ is free from the guard $q^2$ and may fall to one side of said guard upon the bending of the toggle $q$. (See Fig. 33.) The fractions-bar B in this modified construction simply serves by its extreme movement to the left to straighten the toggle to elevate the thumb-piece $d^2$ and does not by its short reciprocations incident to the vibration of the thumb-piece transmit the step-by-step backward movement to the yards-bar C, as in the previous construction. This movement of the yards-bar C is effected by a pawl $d^{9\times}$, as before; but the pawl is mounted and actuated entirely independent of any movement of the fractions-bar through suitable connections with the thumb-piece $d^2$. This pawl (see Figs. 27, 38, 38$^a$, and 38$^b$) consists of a lever $s^3$, mounted through its slot $s$ loosely on a pivot and guiding-stud $s'$, projecting from the rear vertical wall of the inclosing case A, having at its extreme end a rack-engaging finger $s^2$, arranged to enter between the teeth of the operating-rack $d$ on the lower side of the yards-bar C. The lever $s^3$ is provided with a vertical slot $s^4$, engaged by a pin on the lower end of a bell-crank $s^5$, that is pivoted on the stud $s'$, the upper end of the bell-crank being secured to one end of a connecting-rod $s^6$, whose opposite end at the right of the instrument is attached to an arm $s^7$, rising from the pivotal bearing $i'$ of the thumb-piece $d^2$ and integral with its rod $i$, so as to partake of the vibrations of the thumb-piece. (See Fig. 31.) The connecting-rod $s^6$ is engaged by a spring $s^8$, (see Figs. 27$^a$, 32$^b$, and 32$^c$,) tending to move the rod toward the left after its reciprocation to the right by the vibration of the thumb-piece $d^2$, and in this case aids in returning the thumb-piece to its left-hand position in its opening $c$ in the inclosing case A. In the normal position of the parts, as in Fig. 27, the pawl-acting lever $s^3$ rests in its extreme right-hand position upon a pin $s^9$, with its finger $s^2$ out of engagement with the rack $d$ of the yards-bar C, the slot $s$ extending to the right of the stud $s'$ and the pin of the bell-crank $s^5$ at the lower end of the vertical slot $s^4$. Assuming that the yards-bar C has been set to measure one or more yards and is to be moved toward the left to its zero position, the first action of the thumb-piece $d^2$ through the arm $s^7$ when the thumb-piece is vibrated toward the right is to rock the bell-crank $s^5$ in the direction of the arrow, which causes its pin in the slot $s^4$ to simultaneously rock the lever $s^3$ on the stud $s'$ and projects the finger $s^2$ into engagement with the rack $d$ of the yards-bar, as in Fig. 38. Continuing its vibration to the right, the thumb-piece $d^2$ still moving the bell-crank $s^5$, its pin acting against the wall of the slot $s^4$ and unable to further rock the lever $s^3$ upward now moves the lever $s^3$ bodily toward the left, which carries with it the yards-bar C, until the further leftward movement of the lever is stopped by the right-hand end of the slot $s$ striking the stud $s'$, as in Fig. 38$^a$, at which time the yards-bar will have been moved one step toward the left to its zero position and the thumb-piece $d^2$ is at its extreme right-hand position, Fig. 34. On the return of the thumb-piece to the left the upward pressure of the pin of the bell-crank $s^5$ is relieved and the lever $s^3$ drops by gravity onto the pin $s^9$, the finger $s^2$ thus removed from the rack, as in Fig. 38$^b$, leaving the yards-bar undisturbed in its moved position. The completion of the return of the thumb-piece $d^2$ to the left rocks the bell-crank back to its original position, and in so doing draws back the lever $s^3$ to the right to its normal position with the slot $s$ extending to the right of stud $s'$, as in Fig. 27, the parts being now ready to repeat their movements upon the next vibration of the thumb-piece $d^2$. This construction and operation of the pawl $d^9$ effects the positive rearward movement of the yards-bar C by an easy movement with the minimum of friction and without danger of over movement due to momentum. The rack of the yards-bar C may be engaged by a slight spring $s^{10}$ (see Fig. 38) to apply slight friction to the bar and prevent its accidental movement independent of the action of the pawl $d^9$. Of course other modes of moving the yards-bar, may be, will suggest themselves to skilled mechanics, which may be used possibly with equal effectiveness.

The impression-platen $f'$ in this modified instrument is carried at one end of an arm $f^2$, (see Figs. 27, 39, 40, and 41,) that is pivoted at the opposite end to the inner side of a swinging carrier-frame or printing-case $f^3$, in which is provided the ticket or book receiving opening $f$, before described. The platen-arm $f^2$ is borne upon by a spring $f^4$, holding the platen $f'$ normally about flush with the surface of the lower wall of the opening $f$, and the end of the arm $f^2$ is provided with a rack $f^5$, that is engaged by the toothed segment $f^6$ of an operating-lever $f^7$, that extends to the outer side of the carrier-plate $f^3$. Each time the operating-lever $f^7$ is depressed by the operator the arm $f^2$ is vibrated upward to cause the platen $f'$ to press the book or ticket against the overlying type-faces of the type-bars $b^7$ and $c^4$. The ink-ribbon $m$ is carried, as before, by a pair of spools $m'$, one of which is provided with the thumb-wheel $m^2$ to enable the ribbon to be fed along to present a fresh portion to the type-faces. The ink-ribbon $m$, as before, moves over a thin upper guard-plate $m^3$, which supports the ribbon between the spools $m'$ and also prevents contact of the book or ticket with the ribbon except at the point immediately under the type-faces which are to be impressed on the book or ticket, an opening $m^4$ being formed in the guard-plate $m^3$ to allow the book to meet the proper type-faces. The carrier-plate $f^3$ is hinged at one end to the front face of the inclosing case A, (see Fig. 39,) and as the other end is provided with a catch $g'$, arranged to be engaged by a spring-latch $g^2$ on the inner side of the inclosing case, (see Fig. 42), which latch may be moved by a proper key to release the catch $g'$ and allow the carrier-plate $f^3$ to be swung outward, as in Fig. 39, to expose the platen and its operating device and also the ink-ribbon for ready access.

While we have shown and described specific forms of mechanism and devices, it is obvious that the invention is not necessarily limited thereto, and it is also obvious that the parts of the mechanism may be used without necessarily being associated with other parts.

What we claim is—

1. The herein-described yards or other measuring instrument, having a measuring-tally normally resting at zero, a hand-piece for setting the tally at a desired position in advance of said zero position, an actuating device for intermittent operation located at or near the end of the measuring instrument, connections therewith for returning the tally to zero step by step, and means for automatically retiring the actuating device at the end of the measuring operation.

2. The herein-described measuring instrument provided with an open slot at one end thereof and also having a measuring-tally, an actuating device for the tally, means supporting said device projecting through said slot while in use, and means for automatically retiring the actuating device at the completion of the tallying operation.

3. The herein-described measuring instrument having a measuring-tally with means for setting the tally, a movable tally-actuator normally inactive with a device operative in unison with the setting of the tally for setting the actuator into active position, and means for retiring the actuator at the end of the measuring device.

4. The herein-described measuring instrument having a measuring-tally normally resting at zero, means for advancing the measuring-tally to the desired position, an actuating-key resting normally unexposed, and connections with the tally for moving the key to its active position.

5. The herein-described measuring instrument, having a measuring-tally normally resting at zero, means for advancing the measuring-tally to the desired position, an actuating-key resting normally unexposed, and connections with the tally for moving the key to its active position and for returning it to its normal position.

6. The herein-described measuring instrument, having a measuring-tally, a tally-actuating key resting normally unexposed, and connections with the tally for moving the key to its active position and for returning it to its normal position.

7. The combination with a measuring-tally, of an actuator for said tally having a telescopic finger-piece and connections with the tally for moving said telescopic piece into operative position, as set forth.

8. The herein-described measuring instrument, having a measuring-tally and a coöperating recorder, a tally-actuating key resting normally unexposed and connections with the tally for moving the key to its operative position.

9. The combination with a measuring-tally, and a step-by-step actuating device for moving said tally, of an actuating-key for said device resting normally unexposed, and connections with the tally for moving the key to its operative position.

10. The herein-described measuring instrument having a key normally flush with the face of the instrument and means for automatically moving said key into and out of exposed position.

11. The herein-described measuring instrument, having a plurality of keys representing its fractions of unit of measurement and normally lying flush with the face of the instrument, and means connected with a register-setting bar to move the desired key to and from said flush position.

12. The herein-described measuring instrument, having a movable zero-key at one end, a measuring-tally, and an actuating tally-key at the opposite end of the instrument.

13. The herein-described measuring instrument, having a zero-key at one end movable into and out of active position, a measuring-tally, and an actuating tally-key at the opposite end of the instrument.

14. The herein-described measuring instrument, having a zero-key at one end, a measuring-tally, an actuating tally-key at the opposite end of the instrument, and a plurality of movable intermediate keys.

15. The herein-described measuring instrument, having a movable zero-key at one end, a measuring-tally, an actuating tally-key at the opposite end of the instrument, and a plurality of movable intermediate keys.

16. The herein-described measuring instrument, having a zero-key at one end, a measuring-tally resting normally at zero, means for setting the tally at a desired position, an actuating-key for returning said tally to zero, and a plurality of movable keys in addition to said actuating-key.

17. In a measuring instrument the combination with a plurality of movable keys representing its indices of measurement, of a movable setting device for setting any one of the keys into active position as set forth.

18. In a measuring instrument the combination with a plurality of movable keys representing its indices of measurement, of a longitudinally-movable setting-bar for setting one of said keys into active position as set forth.

19. In a measuring instrument the combination with a plurality of normally-unexposed keys representing its indices of measurement, of a movable setting-bar for moving one of said keys into exposed positions as set forth.

20. In a measuring instrument the combination with a plurality of movable keys representing its indices of measurement of a longitudinally movable and rocking setting-bar for moving any one of said keys into exposed position as set forth.

In witness whereof we have hereunto set our hands in the presence of two witnesses.

EDWARD H. PARKS.
EDWARD F. PARKS.
THEODORE P. FARMER.

Witnesses:
WM. S. LAMSON,
JOHN H. MORISON.